United States Patent
Turk (10) Patent No.: US 8,554,790 B2
(45) Date of Patent: Oct. 8, 2013

(54) CONTENT BASED LOAD BALANCER

(75) Inventor: Mladen Turk, Zagreb (HR)

(73) Assignee: Red Hat, Inc., Raleigh, NC (US)

( * ) Notice: Subject to any disclaimer, the term of this patent is extended or adjusted under 35 U.S.C. 154(b) by 754 days.

(21) Appl. No.: 11/959,349

(22) Filed: Dec. 18, 2007

(65) Prior Publication Data

US 2009/0157678 A1   Jun. 18, 2009

(51) Int. Cl.
  *G06F 7/00*    (2006.01)
  *G06F 17/30*   (2006.01)
  *G06F 9/46*    (2006.01)

(52) U.S. Cl.
  USPC .......................... 707/780; 707/782; 718/105

(58) Field of Classification Search
  USPC ................... 707/780, 782, 728; 709/219, 238
  See application file for complete search history.

(56) References Cited

U.S. PATENT DOCUMENTS

| | | | | |
|---|---|---|---|---|
| 6,092,100 | A * | 7/2000 | Berstis et al. | 709/203 |
| 6,799,251 | B1 * | 9/2004 | Jacobs et al. | 711/133 |
| 7,054,917 | B1 * | 5/2006 | Kirsch et al. | 709/217 |
| 7,376,752 | B1 * | 5/2008 | Chudnovsky et al. | 709/245 |
| 7,383,299 | B1 * | 6/2008 | Hailpern et al. | 709/203 |
| 2001/0052016 | A1 * | 12/2001 | Skene et al. | 709/226 |
| 2002/0007404 | A1 * | 1/2002 | Vange et al. | 709/217 |
| 2002/0059170 | A1 * | 5/2002 | Vange | 707/1 |
| 2002/0099807 | A1 * | 7/2002 | Doyle | 709/223 |
| 2002/0133570 | A1 * | 9/2002 | Michel | 709/219 |
| 2004/0049579 | A1 * | 3/2004 | Ims et al. | 709/225 |
| 2004/0128346 | A1 * | 7/2004 | Melamed et al. | 709/203 |
| 2004/0249799 | A1 * | 12/2004 | Demarcken et al. | 707/3 |

* cited by examiner

*Primary Examiner* — James E Richardson
(74) *Attorney, Agent, or Firm* — Lowenstein Sandler LLP (57) ABSTRACT

A content based load balancing system receives a request for data provided by a resource. The content based load balancing system searches a content history cache for a content history cache entry corresponding to the requested data. The content based history cache then selects a resource node to service the request based on the content history cache entry corresponding to the data.

18 Claims, 9 Drawing Sheets

CONTENT BASED LOAD BALANCER

TECHNICAL FIELD

Embodiments of the present invention relate to management of connections between clients and servers. Specifically, the embodiments relate to a method and apparatus for balancing the number of connections handled by each server in a pool of servers.

BACKGROUND

Figure 1:
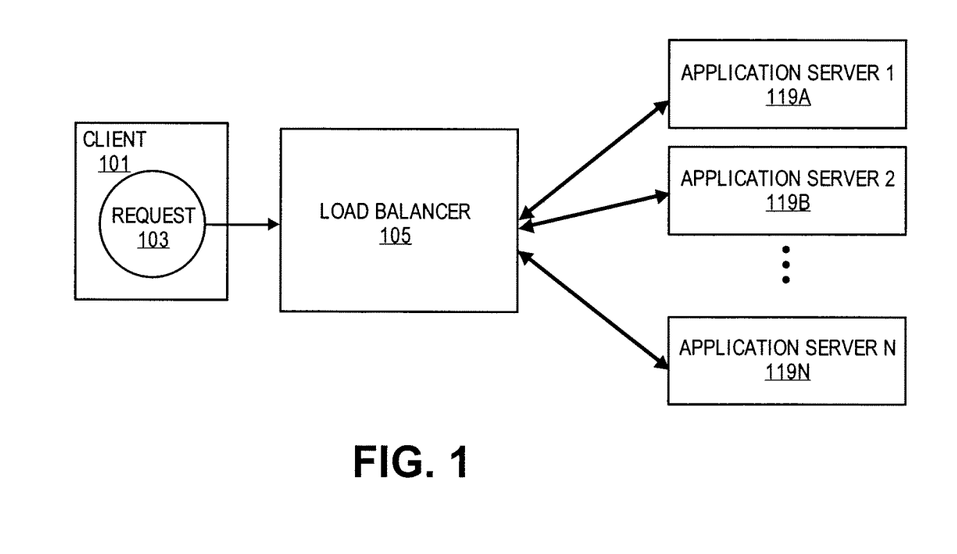
FIG. 1 is a diagram of a system for servicing resource requests.

A standard resource management scenario is illustrated in FIG. 1. A client computer 101 requires data provided by a resource that is made available through a group of servers 119A-119C. The required data can be available from any subset of the group of servers 119A-C. In the illustrated example, the servers are application servers 119A-C that provide a particular application or group of applications to a requesting client 101.

Access to the servers 119A-C is controlled by a load balancing server 105. The load balancing server 105 receives a resource request 103 from a client computer 101 and determines which of the available servers 119A-C will service the request. The load balancing server 105 relies on one of a group of available load balancing modules to make the selection of the server to service the request 103. The load balancing server 105 is configured to utilize one of a set of available load balancing modules that implement schemes or algorithms such as a round robin algorithm, business monitoring, data transfer rate monitoring, and response time monitoring. The load balancing server 105 can be configured by an administrator or user to use any one of these modules or any combination of these modules.

After the load balancing server 105 selects a server, a connection for the selected server is obtained from a connection pool and the request is serviced by the selected server through the connection. Each request is handled in this manner using the same load balancing scheme or algorithm to distribute the requests evenly across the available servers.

BRIEF DESCRIPTION OF THE DRAWINGS

The present invention is illustrated by way of example, and not by way of limitation, in the figures of the accompanying drawings in which like references indicate similar elements. It should be noted that different references to "an" or "one" embodiment in this disclosure are not necessarily to the same embodiment, and such references mean at least one.

DETAILED DESCRIPTION

Described herein is a method and apparatus for balancing a load from a set of clients requesting resources from a set of servers offering those resources. The load balancing system, referred to herein as a 'content based load balancing system,' offers an administrator an alternative option in configuring and optimizing the balancing of the load by analyzing incoming requests to determine the servers that are most likely to be able to quickly service the requests. The analysis of the content allows the load balancing system to determine if the same or similar requests have been recently serviced and direct the requests to the server that recently serviced those requests. The server that recently serviced the similar or same request is likely to have the requested data cached and be able to respond to the request without having to access persistent storage devices with slower access times.

The content based load balancing system receives a request for data provided by a resource. The content based load balancing system searches a content history cache for a content history cache entry corresponding to the requested data. The content based history cache then selects a resource node to service the request based on the content history cache entry corresponding to the data.

In the following description, numerous details are set forth. It will be apparent, however, to one skilled in the art, that the present invention may be practiced without these specific details. In some instances, well-known structures and devices are shown in block diagram form, rather than in detail, in order to avoid obscuring the present invention.

Some portions of the detailed descriptions that follow are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared and otherwise manipulated. It has proven convenient at times, principally for reasons of common usage, to refer to these signals as bits, values, elements, symbols, characters, terms, numbers or the like.

It should be born in mind, however, that all of these and similar terms are to be associated with the appropriate physical quantities and are merely convenient labels applied to these quantities. Unless specifically stated otherwise as apparent from the following discussion, it is appreciated that throughout the description, discussions utilizing terms such as "processing," "computing," "calculating," "determining," "selecting," "displaying," "searching," "receiving," "updating," "modifying," "assigning," "requesting," "notifying," or the like, refer to the actions and processes of a computer system, or similar electronic computing device that manipulates and transforms data represented as physical (electronic) quantities within the computer system's registers and memories into other data similarly represented as physical quantities within the computer system memories, registers or other such information storage, transmission or display devices.

The present invention also relates to an apparatus for performing the operations herein. This apparatus may be specially constructed for the required purposes or it may comprise a general purpose computer selectively activated or reconfigured by a computer program stored in the computer. Such a computer program may be stored in a computer readable storage medium, such as, but not limited to, any type of disk including floppy disks, optical disks, CD-ROMs and magnetic-optical disks, read-only memories (ROMs), random access memories (RAMs), EPROMs, EEPROMs, magnetic or optical cards or any type of media suitable for storing electronic instructions, each of which may be coupled to a computer system bus.

The algorithms and displays presented herein are not inherently related to any particular computer or other apparatus. Various general purpose systems may be used with programs in accordance with the teachings herein or it may prove convenient to construct more specialized apparatus to perform the required method steps. The required structure for a variety of these systems will appear from the description below. In addition, the present invention is not described with reference to any particular programming language. It will be appreciated that a variety of programming languages may be used to implement the teachings of the invention as described herein.

A computer readable medium includes any mechanism for storing information in a form readable by a computer. For example, a computer readable medium includes read only memory ("ROM"), random access memory ("RAM"), magnetic disk storage media; optical storage media, flash memory devices or other type of machine-accessible storage media.

Figure 2A:
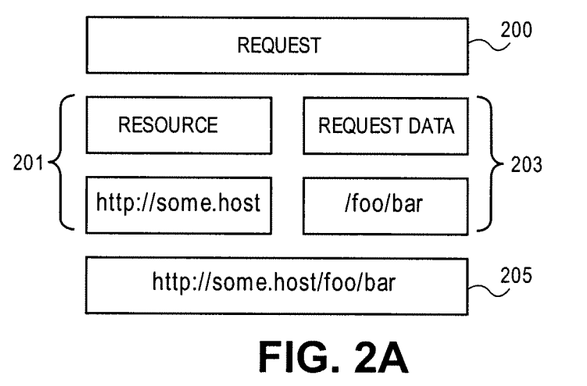
FIG. 2A is a diagram of a structure of a hypertext transfer protocol request.

FIG. 2A is a diagram of structure of a hypertext transfer protocol (HTTP) request. The structure of the request has been abstracted to focus on the most relevant aspects of the request structure. The request 200 includes an identifier 205 of a resource that is to be acted upon. The request 200 can also specify the action to be taken on the resource such as a 'GET' that is a request that the identified resource be sent to the requesting client. The request 200 can also be a 'PUT,' 'HEAD' or any other valid HTTP protocol request. The identifier 205 can be parsed into separate sub-components such as the resource indicator 201 and requested data 203. The resource indicator 201 can be a locator or address such as a uniform resource locator (URL) or similar resource identifier. The requested data 203 can be a file or object name, path name or similar identifier of the data at the resource indicator location 201.

Figure 2B:
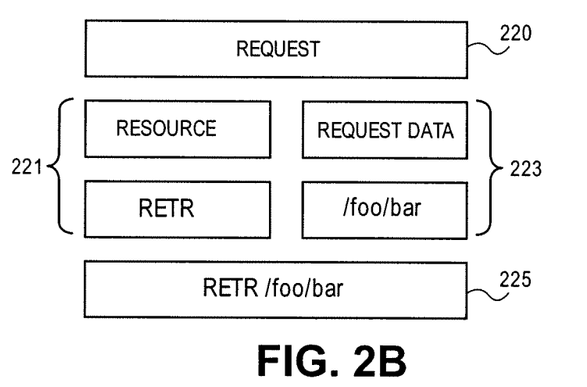
FIG. 2B is a diagram of a structure of a file transfer protocol request.

FIG. 2B is a diagram of structure of a file transfer protocol (FTP) request. The structure of the request has been abstracted to focus on the most relevant aspects of the request structure. The request 220 includes a command 225 related to a resource that is controlled by a file server program. The request 220 specifies the action to be taken on the resource such as a 'RETR' that is a request that the identified resource be sent by the file server to the requesting client. The command 205 can be parsed into separate sub-components such as the resource indicator 221 and requested data 223. The resource indicator 221 can be a command, method or similar action to be performed by the file server. The requested data 203 can be a file name, path name or similar identifier of the data handled by the file server.

Figure 2C:
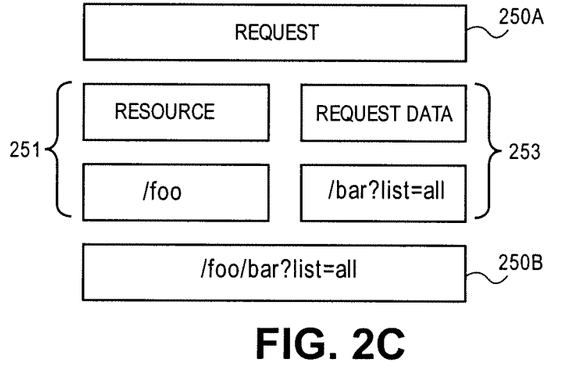
FIG. 2C is a diagram of a structure of request data.

FIG. 2C is a diagram of a structure of requested data in a request such as an HTTP request. Request data 250A,B can have any format, but can generally be divided into a 'match' sub-component 251 and a 'payload' sub-component 253. The match data 251 can be a pathname or other location information. For example, in the illustrated HTTP example the data "/foo" identifies a path name for the web server to assist in the location of the payload data. The payload 253 can be a filename, query string or similar identification for specific data at the location of or provided by the server specified by the resource indicator and the match data 251. For example, in the illustrated HTTP example the data "/bar?list=all" is a query string to be executed to retrieve the desired data from a database or similar program or resource.

The example structures of FIGS. 2A-C are provided by way of example to illustrate the structure of incoming requests that can be utilized to determine the content associated with the requests. The principles discussed in relation to these examples would be understood by one of ordinary skill in the art to apply to other request structures. Conceptualizing the request structure in this manner enables the parsing and analysis of requests as well as the caching of the requests that are utilized in the content based load balancing system.

Figure 3:
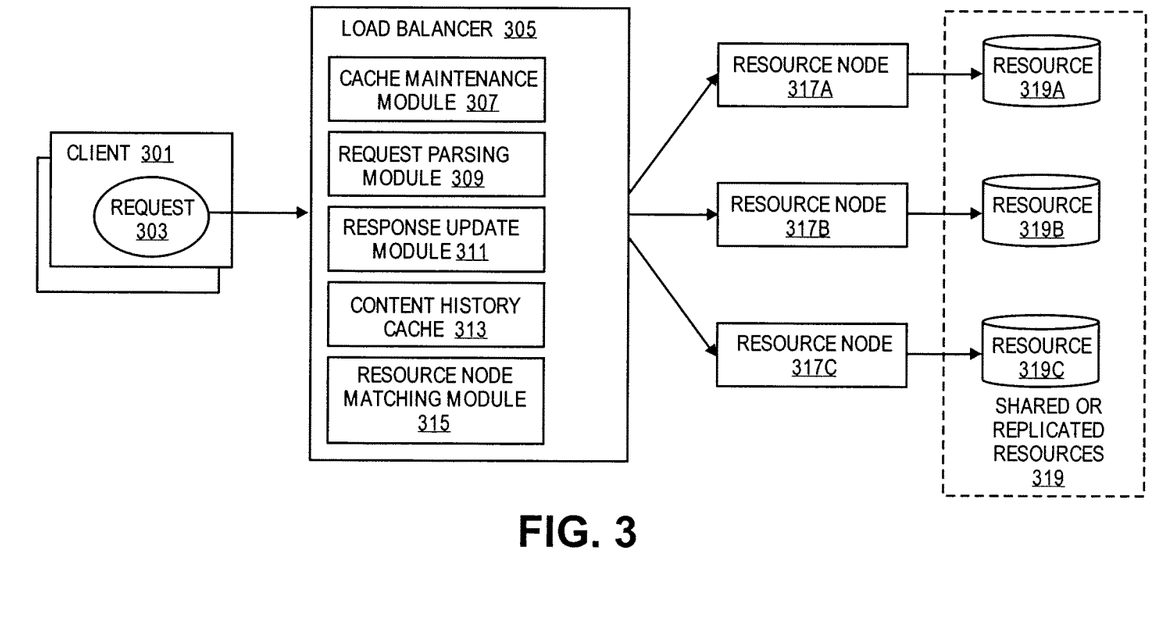
FIG. 3 is a diagram of one embodiment of a content based load balancing system.

FIG. 3 is a diagram of one embodiment of a content based load balancing system. The content load balancing system includes a client 301, load balancer 305, a set of resource nodes 317A-C, a set of resources 319A-C and similar components. A 'set,' as used herein, refers to any whole positive number of items including one item. The content load balancing system can service any number or types of clients 301. The content load balancing system can provide any number or variety of resources 319A-C to those clients.

The client 301 can be any computing device including a desktop or laptop computer, a workstation, a server, a handheld device, a console device or similar computing device. The client 301 can execute an application that generates a request 303 for a resource. The application can be a web browser, file transfer application, business process application or similar application that utilizes remote resources. The requested resource may be a web page, file, database data or similar data. The request 303 can have any format and conform to any protocol. For example, a request 303 for a web page may be an HTTP request and a request for a file may be a FTP request.

The request 303 is received at or near a destination server by a load balancer 305. A load balancer 305 can be any type of computing device including a workstation, server, network device or similar computing device. The load balancer 305 manages access to a set of resource nodes 317A-C that service client requests for resources 319A-C. The load balancer 305 includes a content history cache 313, cache maintenance module 307, request parsing module 309, response update module 311 and resource node matching module 315. Each of these modules work in combination to implement content based load balancing. The division of functionality into these discrete modules would be understood by one skilled in the art to be an example implementation. The functionality of these module could be divided into any number or combination of modules including an implementation with a single module.

A content history cache is a storage device or set of tables that track the previously processed resource requests. The table can be referenced each time a new request for a resource is received. If a matching or similar resource to that which is currently requested has recently been requested then the table entry for the match or closest match can be utilized for selecting a resource node to service the received request. The matching or closest matching entry includes an indicator of the resource node that serviced the associated previous request. The same resource node is then used for the currently received request, because it is likely that the resource node that serviced the match or closest matching previous request has cached the requested data and will not have to access the data in a persistent storage device with a slow access time thereby allowing the current request to be serviced quickly.

A request parsing module 309 processes each incoming request to determine the resource and data that has been requested and similar information about the incoming request that can be utilized for looking up or searching for previously processed requests as well as identifying information about the incoming request that can be used to create an entry for the incoming request in the content history cache. For example, the request parsing module 309 may identify the match and payload of a data request of an HTTP request and provide the match and payload as separate parameters to other content load balancer components.

A resource node matching module 315 can process each of the incoming requests to match them with an available resource node. The resource node matching module 315 can utilize other components such as the request parsing module 319 to identify relevant data in a request and the content history cache 313 to find matches or near matches to the current requests and select a resource node 317A-C to service the current request. The resource node matching module 315 can use utilize any combination of matching criteria to determine a resource node 317A-C to service a request. For example, a resource node matching module can look first for exact matches and then for near or 'pattern' matches if an exact match is not found. A pattern match can by any type of search that looks for cache entries that are similar to the data associated with a current request. Examples of pattern matching include using wildcards for particular segments of a data request or searching for portions of the data request disjunctively.

A response update module 311 updates a content history cache to incorporate results from resource requests. The load balancer 305 receives responses from resource nodes that are servicing requests. The response update module 311 can create new entries that record the server and associate it with the requested data. The response updated module 311 can also update existing content history cache entries that have been relied upon for a selection of a resource node. When a response based on a content history cache entry is received the entry can also be updated to set the validity of the entry, modify weighting associated with the entry or similarly update the entry.

A cache maintenance module 307 periodically updates the content history cache to invalidate old entries or similarly manage the content history cache. Any set of criteria can be set for performing maintenance on the content history cache. For example, a cache maintenance module 307 can run at fixed intervals and update a validity of each entry by decrementing the validity or by using a similar scheme to limit the time that an entry is considered valid. In the example scheme, once a validity for an entry reaches zero or a similar threshold the entry becomes invalid. Weights of entries and other data associated with entries can also be updated.

The content load balancing system can support any number of resource nodes 317A-C. Resource nodes 317A-C can be desktops, workstations, dedicated servers or similar machines capable of executing an application that provides access to and services requests for a resource or set of resources 319A-C. Resource nodes 317A-C can be separate from or combined with the resource 319A-C. The resource nodes 317A-C can be database management systems, application servers, file servers, web servers or similar data providing programs.

The data provided by these programs is stored in a set of persistent storage devices such as magnetic storage devices or arrays (e.g., a hard drive or a redundant array of independent disks (RAID)), optical storage devices or similar storage devices. These persistent storage devices have slow access times, often on the order of milliseconds, that limit the response time of the resource nodes 317A-C. However, if the requested data has recently been accessed then it is likely to be available in system memory, local caches or similar storage devices with fast access times, often on the order of micro-seconds. This can significantly improve response times for the resource node, when the data is available in these fast access memories and does not have to be retrieved from the persistent storage devices.

The data available from each resource 319A-C can vary. In one embodiment, the resources are shared or replicated resources 319. In another embodiment, a sub-set of the data is shared or replicated. The content based load balancing system is effective for resources and resource nodes with overlapping or co-extensive data sets because improved response times can be obtained by matching requests with the resource node that has recently accessed the required data instead of another resource node that may have access to the same data, but hasn't accessed it recently.

Figure 4:
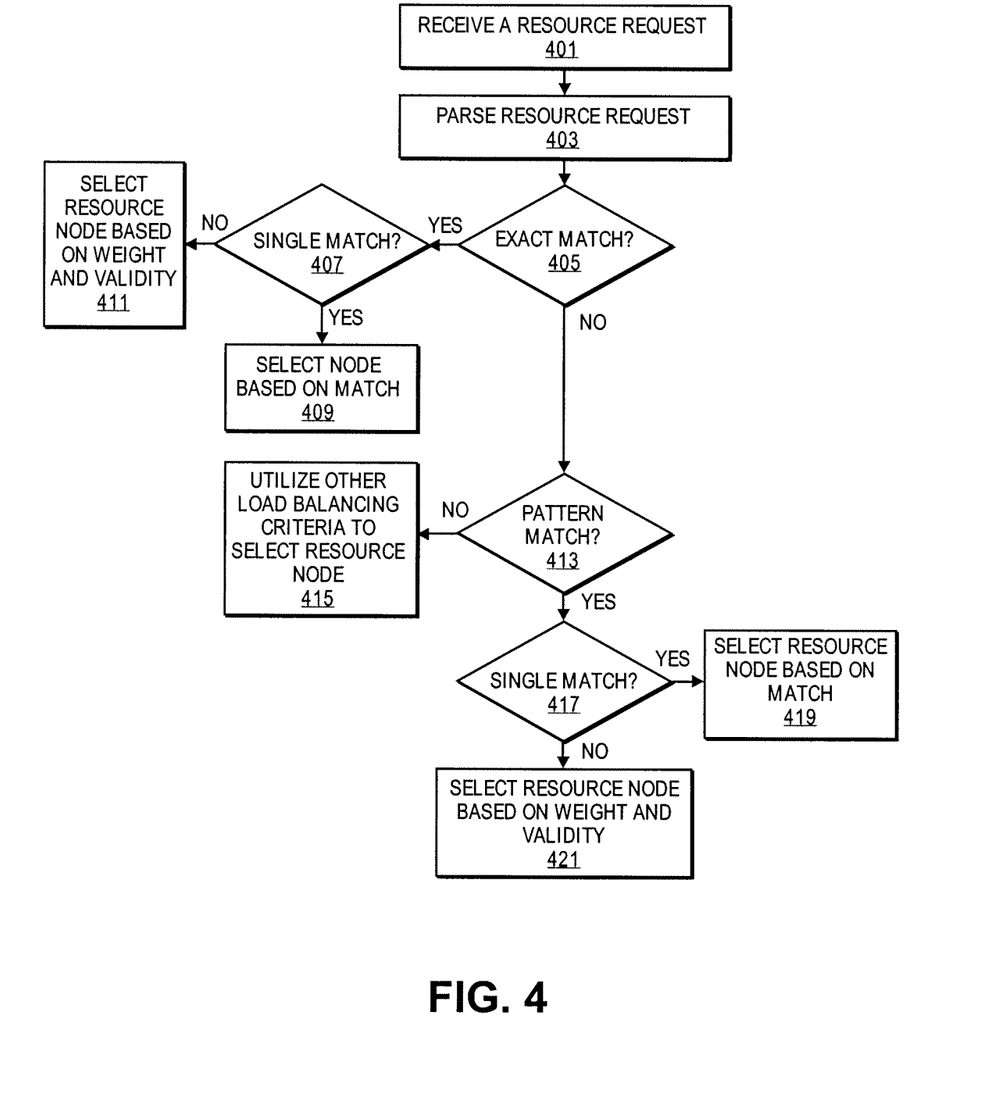
FIG. 4 is a flowchart of one embodiment of a process for selecting a connection and resource node to service a resource request based on the request content.

FIG. 4 is a flowchart of one embodiment of a process for selecting a connection and resource node to service a request based on the request content. The process can be initiated in response to the content load balancing system receiving a request from a client (block 401). The request can have any format (e.g., HTTP request, FTP request or any similar well defined protocol format) and can be received from any client in communication with the content load balancing system.

The content load balancing system parses the incoming request according to the type of its request (block 403). The parsing can be done by a dedicated parsing module or any other component of the content load balancing system. Parsing the data identifies the relevant aspects of the incoming request based on the format of the request. For example, an HTTP request includes request data identifying the resource and more specifically a match and payload that may identify a pathname and query string or similar request information. The identified data is used as a key or search string to look up whether any of the resource nodes have recently accessed the requested data. The look up can be for exact matches based on the content of the requested data identified by the parsing (block 405). The look up operation is carried out by a resource node matching module utilizing a content history cache.

If exact matches are found in the content history cache, then the number of exact matches are determined (block 407). If a single match is found, then the resource node identified by the matching entry is utilized (block 409). A connection is opened or obtained and the incoming request is forwarded to the selected resource node. If multiple matches are found in the content history cache, then a resource node is selected based on a comparison of the weight and validity data for each matching entry (block 411). The validity of each entry is an indicator or measure of how recent the requested data was accessed on the associated resource node. The more recent the access and higher the validity value, the more likely that the requested data is still available in the associated resource node's fast access memory.

The weight can be a secondary indication of the suitability of the associated resource node to service a request. The weight can be set based on any criteria including specific weighting set by an administrator or dynamic values that are based on monitored response times, data transfer loads or other load balancing metrics or schemes. The weights and validity values can be compared and/or combined in any combination and based on any criteria to determine the best resource node to select to service a request.

If a resource node is selected based on its validity and/or weight from a set of exact matches, then a check can be made to determine whether the resource node in fact has the relevant data in a fast access memory (e.g., caches or system memory). If the selected resource node does not have the data available in the fast access memory, then the next best selection based on the validity and/or weight can be utilized. This process can iterate through the list of exact matches amongst the available resource nodes until a resource node is found that has the requested data available in the fast access memory. If none of the resource nodes have this data available, then the resource node selection process may be restarted, another selection process utilized or an error returned.

In the case where an exact match to the content of a request is not found, then a pattern match can be executed and a check made to determine if any pattern matches were found (block 413). A pattern match can be any type of search based on the parsed values derived from the incoming request data. The pattern match search can utilize wildcards to find partial matches, sub-sets of the derived parameters can be searched and similar search techniques can be utilized to find analogous content in the content history cache. A determination is then made whether a single match has been found (block 417). If a single match is found, then the resource node identified by the matching entry is selected for handling the incoming request (block 419). If multiple matches are found, then a resource node is selected based on a comparison or analysis of the weight and validity of the entries (block 421). The comparison and analysis can be the same as that applied to exact matches or can be modified or configured to be distinct from that used on exact matches. This includes the iteration through pattern matches until a resource node with the data available in a fast memory is determined.

In the case where a pattern match is not found, then other types of load balancing algorithms or schemes can be applied to select an available resource node. Other load balancing algorithms or schemes can include a round robin scheme, a response time monitoring scheme, a data transfer load monitoring scheme, or similar load balancing scheme. The administrator or similar user can configure the system to use any one or combination of these algorithms and schemes.

Figure 5A:
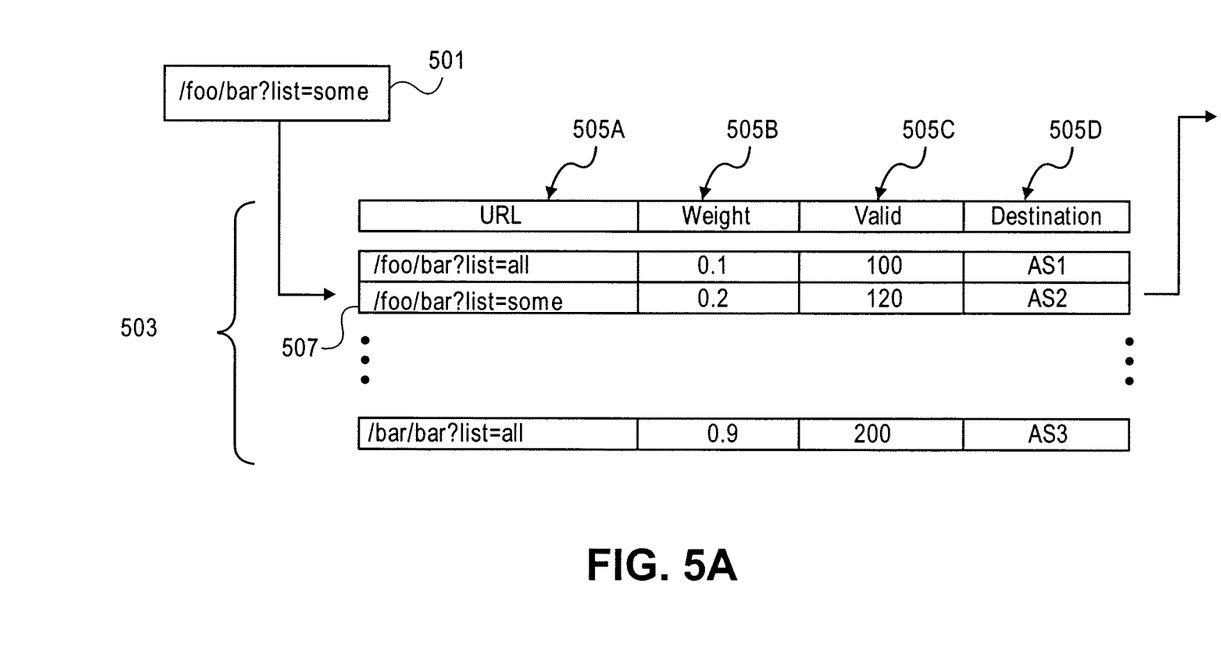
FIG. 5A is a diagram of one embodiment of a look-up in a content history cache.

FIG. 5A is a diagram of one embodiment of a look up in a content history cache. The requested data 501 of an incoming request is compared against the entries of a content history cache 503. In the illustrated embodiment, the content history cache is structured such that each entry includes a resource or requested data identifier field (e.g., a URL) 505A, a weight field 505B, a validity field 505C and a destination field 505D (i.e., the resource node that handled the previous request represented by the entry).

In the illustrated example, the incoming request data 501 matches a single entry 507 in the content history cache 503. This entry 507 can then be utilized by the resource node matching module to select a resource node (in the example, AS2). If more than one matching entry were found, then the weight 505B and validity 505C values for each matching entry can be analyzed to select a destination resource node.

Figure 5B:
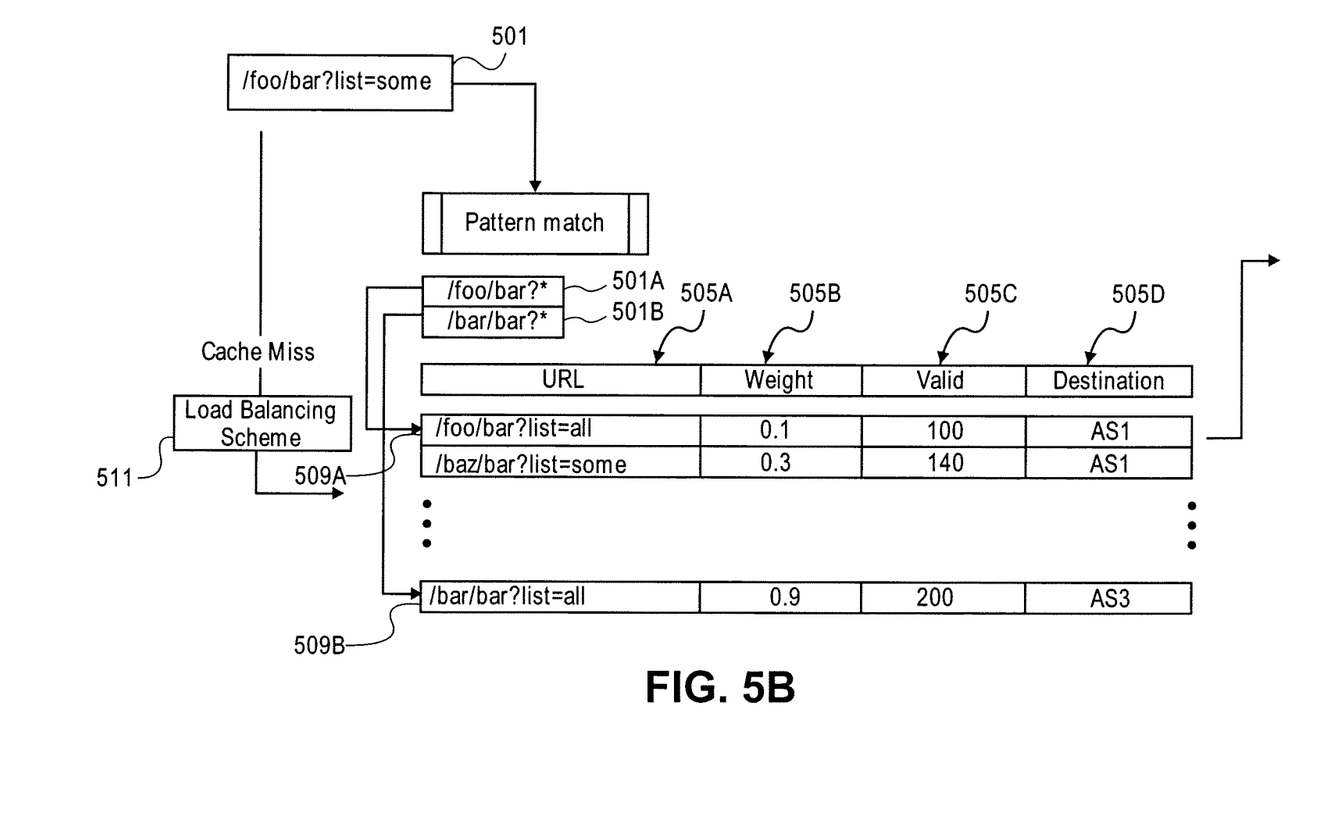
FIG. 5B is a diagram of one embodiment of a pattern search of a content history cache.

FIG. 5B is a diagram of one embodiment of a pattern search of a content history cache. If an exact match is not found, then a pattern match is searched for in the content history cache. The request data 501 of the incoming request is modified for pattern matching. Wildcards can be added, sub-components removed or modified, or similar changes or permutations to the requested data can be performed. In the illustrated example, the requested data is reduced to the match portion 501A (i.e., the payload is replaced with wildcard '*'). The requested data is also modified to a similar pathname 501B. The content history cache is then searched for matches to each of the modifications. In the illustrated example, each of the modified searches yields an entry 509A,B. If a single entry is found then the associated destination resource node is selected. In the case where multiple entries are found, the weight and validity are compared or analyzed to select the entry to be utilized.

If no pattern match is found (i.e., there is a cache miss), then a load balancing scheme or algorithm 511 is applied to select a resource node and an entry is created for the new request reflecting the selected resource node and setting the weight and validity. Any load balancing scheme can be applied including round robin, data transfer load, response time or similar scheme. Weights and validity of entries in the content history cache can also be utilized to select a resource node.

Figure 6:
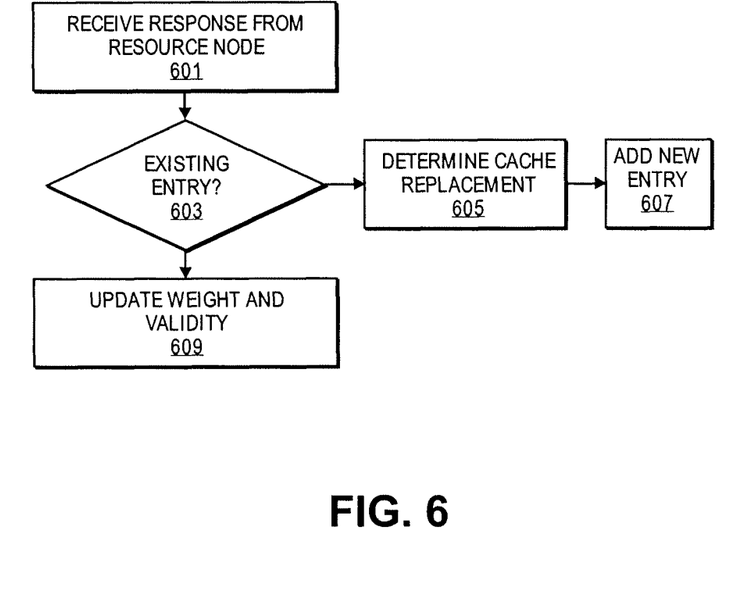
FIG. 6 is a flowchart of one embodiment of a process for updating a content history cache based on a response.

FIG. 6 is a flowchart of one embodiment of a process for updating a content history cache based on a response. The process can be initiated upon receipt of a response to a request from a resource node (block 601). Each request for data is responded to and the load balancer can monitor the responses to maintain weight and validity data in the content history cache. Each response can be checked against the existing cache entries to determine if a matching entry exists (block 603).

If an entry corresponding to the response is present in the cache, then the weight and validity of the entry are updated. The validity may be a counter that is decremented periodically until the entry is invalidated once a threshold validity is reached (e.g., the validity approaches or reaches zero). The validity counter can be reset or incremented upon receipt of the response. The weight can be a normalized measure of a metric such as the response time of the resource node that generated the response. The weight can be based on other similar metrics including data transfer rate, business or similar measurements of resource node availability and performance.

If an entry corresponding to the response is not present in the cache, then a new entry must be created. If there is room in the cache to create a new entry, then the entry can be added without further process (block 607). However, in most instances the cache will not have empty spaces. A cache replacement scheme is activated to determine which of the locations in the cache are to be freed to accommodate a new entry (block 605). Any cache replacement scheme can be utilized to select an entry for eviction including a least recently used (LRU) scheme, round robin, first in first out (FIFO), stack or similar cache replacement scheme. In one example, the validity of entries can be checked and invalid entries evicted before valid entries are evicted.

After an entry has been evicted, then a new entry for the received response is created (block 607). The new entry can include the requested data identifier, a weight, a validity value, an identifier for the servicing resource node and similar information. The weight is based on a measured metric or default value. A validity is based on a maximum value or similar validity tracking scheme. The requested data identifier and identifier for the servicing resource node can be determined from the response data or connection data.

Figure 7:
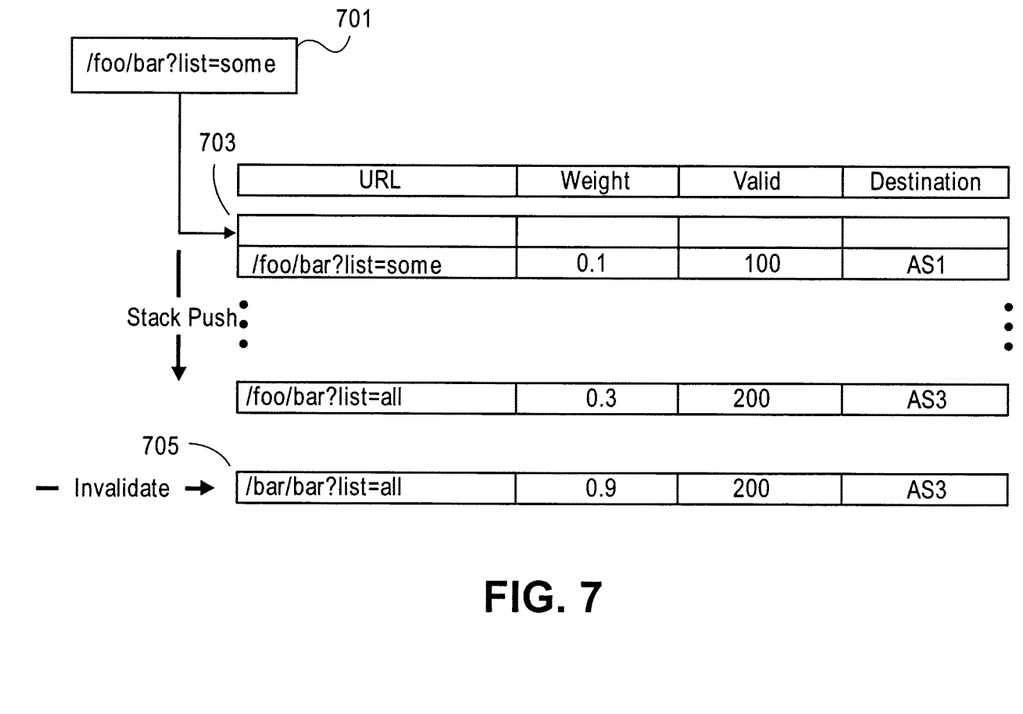
FIG. 7 is a diagram of one embodiment of a cache entry replacement in the content history cache.

FIG. 7 is a diagram of one embodiment of a cache entry replacement in the content history cache. In the illustrated example, the content history cache is implemented as a stack. A response or request 701 is to be added as a new entry onto the stack. This process can be executed at the time a request is assigned to a resource node (the weight and validity updated at a later time) or the entry can be created at the time that a response is received from a resource node (the weight and validity being known at this time). The new entry is added to the top of the stack 703. All other entries are 'pushed' down on the stack. The last entry 703 in the stack is then removed from the stack and invalidated. The stack could be reordered at any time based on validity, weight values or similar criteria so that the entries that are most out of date or least likely to result in a quick resolution to a request are pushed out of the stack before other entries.

Figure 8:
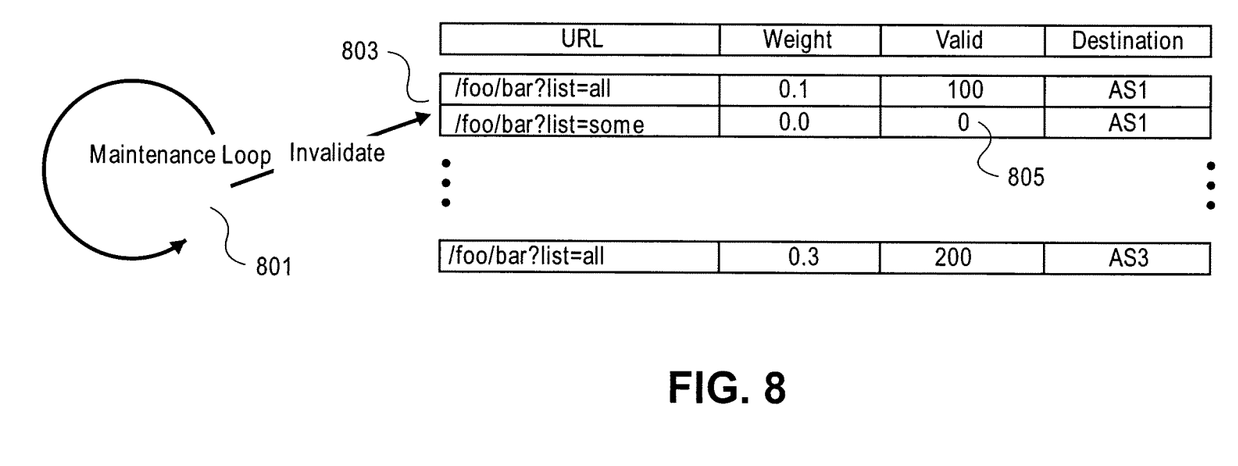
FIG. 8 is a diagram of one embodiment of a maintenance update of the content history cache.

FIG. 8 is a diagram of one embodiment of a maintenance update of the content history cache. A maintenance update can be performed by a separate thread, process 801 or modules such as the cache maintenance module. The maintenance update can be configured to run at predetermined times or in response to predetermined events. For example, a maintenance update can be performed at fixed intervals based on real time, a number of operations or similar metrics.

The maintenance update examines each entry in the cache and can update each entry. The maintenance update can decrement the validity of each entry until a threshold on the validity is reached. Entries that exceed the threshold can be invalidated. For example, an entry 803 has its validity decremented such that it reaches zero 805. The maintenance update then invalidates that entry. Invalidation can remove the entry from the cache, flag the entry as invalid or similarly invalidate an entry. The threshold for invalidation can be set at any level and the maintenance update can decrement or update the validity value using any increment or scheme.

Thus, a method and apparatus for balancing a load across a set of nodes providing a set of resources based on the content of incoming requests has been described. It is to be understood that the above description is intended to be illustrative and not restrictive. Many other embodiments will be apparent to those of skill in the art upon reading and understanding the above description. The scope of the invention should, therefore, be determined with reference to the appended claims, along with the full scope of equivalents to which such claims are entitled.

The invention claimed is:

1. A computer-implemented method comprising:
   receiving a request for data by a computing device executing a load balancing module, wherein the data is provided by a plurality of resource nodes;
   searching, by the computing device, a content history cache for one or more content history cache entries corresponding to the data, at least one of the one or more content history cache entries comprising an indicator of a resource node of the plurality of resource nodes that serviced an associated previous request, wherein the content history cache is not located on the plurality of resource nodes;
   responsive to finding the one or more content history cache entries, selecting a first resource node of the plurality of resource nodes to service the request in accordance with a first load balancing algorithm, the first load balancing algorithm being a content based load balancing algorithm, wherein the selecting comprises:
      responsive to finding a single content history cache entry, selecting the first resource node associated with the single content history cache entry; and
      responsive to finding a plurality of content history cache entries, selecting the first resource node based on a weighting value and a validity value of at least one of the found plurality of matching content history cache entries;
   responsive to failing to find the one or more content history cache entries, selecting a second resource node of the plurality of resource nodes to service the request in accordance with a second load balancing algorithm; and
   forwarding the request to the selected first resource node or the selected second resource node.

2. The computer-implemented method of claim 1, wherein the request comprises an identifier of the data, the identifier being a uniform resource locator (URL).

3. The computer-implemented method of claim 1, wherein finding the one or more content history cache entries corresponding to the data comprises determining a nearest non-exact match between an identifier of the data from the request and an identifier in at least one of the one or more content history cache entries, the non-exact match comprising a pattern match.

4. The computer-implemented method of claim 1, further comprising:
   updating at least one of the one or more content history cache entries with response data from the first resource node.

5. The computer-implemented method of claim 4, wherein the updating comprises:
   modifying at least one of the weighting value and the validity value of the at least one content history cache entry.

6. The computer-implemented method of claim 1, wherein the second load balancing algorithm is a non-content based load balancing algorithm.

7. The computer-implemented method of claim 1, further comprising:
   modifying a validity of at least one of the one or more content history cache entries in response to predetermined criteria.

8. A non-transitory computer readable medium, having instructions stored therein, which when executed, cause a computing device to perform a set of operations comprising:
   receiving a request for data by a load balancing module running on the computing device, wherein the data is provided by a plurality of resource nodes;
   searching, by the load balancing module, a content history cache for one or more content history cache entries corresponding to the data, at least one of the one or more content history cache entries comprising an indicator of a resource node of the plurality of resource nodes that serviced an associated previous request, wherein the content history cache is not located on the plurality of resource nodes;
   responsive to finding the one or more content history cache entries, selecting a first resource node to service the request in accordance with a first load balancing algorithm, the first load balancing algorithm being a content based load balancing algorithm, wherein the selecting comprises:
      responsive to finding a single content history cache entry, selecting the first resource node associated with the single content history cache entry; and
      responsive to finding a plurality of content history cache entries, selecting the first resource node based on a weighting value and a validity value of at least one of the found plurality of matching content history cache entries;
   responsive to failing to find the one or more content history cache entries, selecting a second resource node of the plurality of resource nodes to service the request in accordance with a second load balancing algorithm; and
   forwarding the request to the selected first resource node or the selected second resource node.

9. The non-transitory computer readable medium of claim 8, wherein the request comprises an identifier of the data, the identifier being a uniform resource locator (URL).

10. The non-transitory computer readable medium of claim 8, wherein finding the one or more content history cache entries corresponding to the data comprises determining a nearest non-exact match between an identifier of the data from the request and an identifier in at least one of the one or more content history cache entries, the non-exact match comprising a pattern match.

11. The non-transitory computer readable medium of claim 8, having further instructions therein, which when executed, cause the computer to perform a further set of operations, further comprising:
updating at least one of the one or more content history cache entries with response data from the first resource node.

12. The non-transitory computer readable medium of claim 11, wherein the updating comprises:
modifying the weighting value and the validity value of the at least one content history cache entry.

13. The non-transitory computer readable medium of claim 8, wherein the second load balancing algorithm is a non-content based load balancing algorithm.

14. The non-transitory computer readable medium of claim 8, having further instructions stored therein, which when executed perform a set of operations, further comprising:
modifying the validity value of at least one of the one or more content history cache entries in response to predetermined criteria.

15. A system comprising:
a memory device; and
a processor coupled to the memory device, wherein the processor is configured to:
receive a request for data, wherein the data is provided by a plurality of resource nodes;
search a content history cache for one or more content history cache entries corresponding to the data, at least one of the one or more content history cache entries comprising an indicator of a resource node of the plurality of resource nodes that serviced an associated previous request, wherein the content history cache is not located on the plurality of resource nodes;
responsive to finding the one or more content history cache entries, select a first resource node to service the request in accordance with a first load balancing algorithm, the first load balancing algorithm being a content based load balancing algorithm, wherein the selecting comprises:
responsive to finding a single content history cache entry, selecting the first resource node associated with the single content history cache entry; and
responsive to finding a plurality of content history cache entries, selecting the first resource node based on a weighting value and a validity value of at least one of the found plurality of matching content history cache entries;
responsive to failing to find the one or more content history cache entries, select a second resource node of the plurality of resource nodes to service the request in accordance with a second load balancing algorithm; and
forward the request to the selected first resource node or the selected second resource node.

16. The system of claim 15, wherein the processor is further configured to parse the incoming resource request to determine a requested data identifier.

17. The system of claim 15, wherein the processor is further configured to update the validity value and the weight value of at least one of the one or more content history cache entries in response to receiving a resource node response to the incoming request.

18. The system of claim 15, wherein the processor is further configured to periodically update the validity value of at least one of the one or more content history cache entries in response to predetermined criteria.

* * * * *